UNITED STATES PATENT OFFICE.

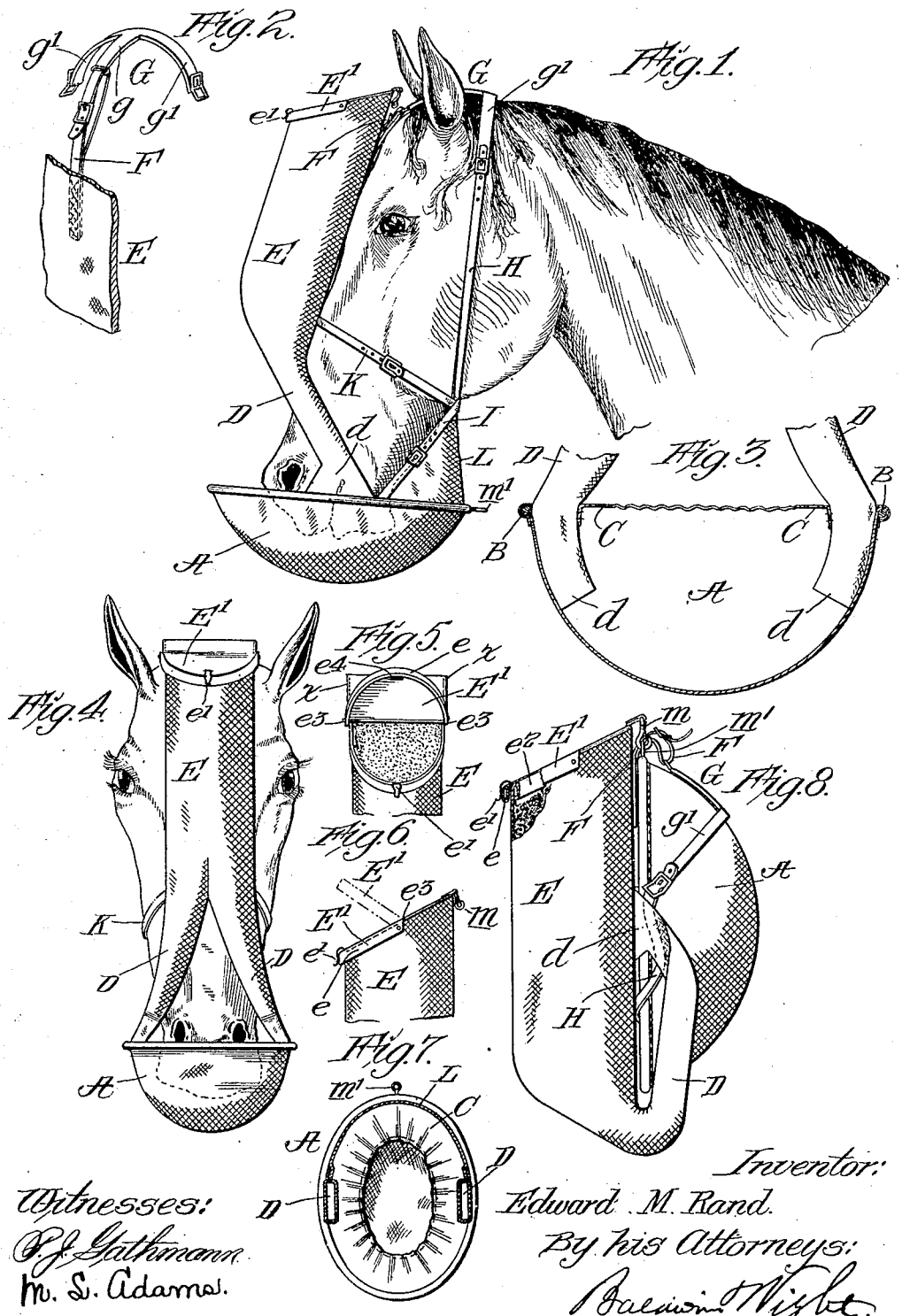

EDWARD M. RAND, OF NEW YORK, N. Y.

FEEDING DEVICE FOR HORSES.

No. 913,305.　　　Specification of Letters Patent.　　　Patented Feb. 23, 1909.

Application filed September 14, 1908. Serial No. 452,974.

*To all whom it may concern:*

Be it known that I, EDWARD M. RAND, a citizen of the United States, residing in the city, county, and State of New York, have invented certain new and useful Improvements in Feeding Devices for Horses, of which the following is a specification.

My invention relates to that class of horse feeding devices which are adapted to be suspended from the head of the horse and to hold the feed below the horse's mouth. The usual kind of feeder for this purpose is what is known as a "nose-bag," wherein the feed receptacle is made of sufficient size to contain enough feed for a single meal and is arranged to extend up around the horse's nose or muzzle above the nostrils. There is great liability of waste of food in such feeders and furthermore there is insufficient ventilation, the animal not being able to breathe freely.

The object of my invention is to provide a feeder which avoids the waste of feed and allows the horse to breathe in the natural way without hindrance.

In carrying out my invention I provide a feed-holder to which feed, such as oats, is automatically supplied from a reservoir placed above it and which is supported on the head of the horse by suitable fastening devices. The reservoir is adapted to extend from the top of the horse's head down the front thereof and at its lower end it is bifurcated or formed into divergent tubes which extend to the feed-holder or basin, which latter is preferably formed of canvas and has a reinforced rim from which projects inwardly a covering having a central opening to allow the horse to insert his mouth into the basin. The tubes extend through the covering and are secured thereto, as well as to the rim of the basin, which latter is preferably provided with a shield at the rear extending above it to coöperate with the cover to prevent the waste of feed under all conditions. In order to support the reservoir and basin, I preferably attach to the rear face of the reservoir near its upper end a strap to which is connected a three-armed fastening device made of pliable metal covered with leather or other suitable material. One of the arms is adapted to extend between the ears of the horse over the top of his head, while the other arms extend downward in rear of the ears in opposite directions and are adjustably connected with straps extending to the lower parts of the cheeks where they are connected with other adjustable straps extending diagonally forward to the rim of the basin. An adjustable strap also extends around the upper part of the nose of the horse and is attached to the rear side of the reservoir. The reservoir is provided with a suitable cover at the top and the rim at the top of the reservoir carries a fastening device coöperating with another fastening device carried by the basin, whereby when the feeder is folded it may be held in such condition.

In the accompanying drawings, Figure 1 is a side elevation of my improved feeder applied to the head of a horse. Fig. 2 is a detail view in perspective of the fastening device for connecting the upper end of the reservoir with the top of the horse's head. Fig. 3 is a view on an enlarged scale and in section illustrating particularly the connection between the feed tubes and the basin. Fig. 4 shows a front elevation of the feeder applied to the head of a horse. Fig. 5 is a detail view of the upper portion of the reservoir with its cover. Fig. 6 is a similar view showing by dotted lines the cover in its raised position. Fig. 7 is a view partly in section and partly in plan, showing the feed basin, the rear shield and the feed-tubes. Fig. 8 illustrates the manner in which the feeder is folded.

The feed-holder or basin A is quite shallow as compared with the ordinary nose-bag. It is preferably of the shape shown and may be made of canvas or other suitable material. It is reinforced at the rim by a wire tube, reed or other suitable reinforcer B, which is covered, as shown in Fig. 3, by the canvas at the upper edge of the basin. The basin is partially covered by suitable material, such as canvas, C, in which there is a central opening to allow the horse to insert his mouth to reach the feed supplied to the lower portion of the basin through the tubes D, extending from the reservoir E, which latter, as shown, is adapted to be attached to the horse's head above the basin. Preferably this reservoir is made of canvas. Its flat, rear side is adapted to rest against the front of the horse's head between the eyes and it is considerably narrower than the head so as not to obstruct the eyes. At its upper end the reservoir has a cover E' which is preferably made of canvas, its rear portion being stitched to the side edges of the reservoir as indicated at x, while the front portion is not so stitched but is provided with a reinforced rim e, adapted to fit over the reinforced portion e² of the upper edge of the reservoir. The cover hinges on the line e³ and has a slot e⁴ with which a suitable fastening device e' on the reservoir is adapted to engage. The lower portion of the reservoir is bifurcated to form the tubes D before referred to, which extend to opposite sides of the basin and have flattened or widened lower portions d which extend through the cover and are attached thereto in the manner shown or in other suitable ways. By this arrangement not only is the feed basin supported from the reservoir but the reservoir is prevented from moving sidewise on the horse's head. At its upper end the reservoir is supported by a strap F, secured to its rear side and adjustably connected with a three-armed fastening device G, of pliable metal preferably covered with leather or other suitable material. One arm g to which the strap F is connected is adapted to extend between the ears of the horse over the top of his head and joins the lateral arms g' which are adapted to extend in opposite directions across the head behind the ears, their lower ends being adjustably connected with straps H, extending downwards to the lower portions of the cheeks where they are connected to adjustable straps I, which extend downwards and forwards to the rim of the basin and are connected thereto near its middle portion. An adjustable strap K is adapted to encircle the nose of the horse about midway between the eyes and nostrils and is connected at the rear with the straps H and I. The strap K prevents the reservoir from rising on the horse's head and also prevents any forward movement thereof. By these devices the reservoir and feed-pan may be quickly adjusted and fitted to any horse's head and easily placed in feeding position. No other adjustments are required for placing the feeder in feeding position or moving it therefrom after the first adjustment. I may also employ a fender L, extending from the rear portion of the rim of the basin to the straps I. The horse sometimes thrusts its nose high in the air, often above the plane of its ears and there might be some loss of feed under such conditions without the use of a fender such as that illustrated but by employing such a device, should the horse thus raise its head, the feed will be caught by the fender and will be returned to the basin when the horse's head is lowered.

The above described feeder is, of course, intended for feeding the horse on the street or elsewhere, if desired. It insures great economy because only a relatively small amount of feed is contained in the basin at any one time and there is no danger of loss of feed should the horse move its head about in any possible way. At no time is the breathing of the horse interfered with by any parts of the feeding device.

The feed automatically passes by gravity from the reservoir to the basin, the level therein being automatically maintained and this level is high enough to permit the horse to easily reach the feed but so low as to prevent waste.

Provision is made for a slight freedom of movement of the head relatively to the basin. The horse, by lowering his head can, by his lips, take up the desired quantity of feed and then raise the lips slightly above the level of the feed while masticating.

The feeder may be folded into a compact space as shown in Fig. 8 and held in this condition by fastening devices m, m'. In the condition shown in Fig. 8, the reservoir may be filled and then applied to the horse's head by means of the straps and fastening devices before described.

The feeding device has been described as intended for feeding horses, but of course it may be used for feeding mules and other animals.

I claim as my invention:

1. A feeding device for horses comprising a feed holder, a reservoir adapted to be secured to the front of a horse's head and having tubes at its lower end extending downwardly and rearwardly to the feed holder to which said tubes are attached, and devices for suspending the reservoir from the top of the horse's head.

2. A feeding device comprising a feed holder, a reservoir adapted to be secured to the front of a horse's head and having tubes communicating with it and extending from its lower end downwardly and rearwardly to opposite sides of the feed holder to which they are attached, devices extending from the upper part of the reservoir upwardly and rearwardly to support the reservoir from the top of the head of the horse, and means applied to the lower part of the reservoir to connect it to the lower part of the animal's head.

3. The combination of a reservoir having a bifurcated lower portion forming divergent tubes, a feed basin having an annular cover through which the tubes extend and to which they are secured, means for attaching the reservoir to the head of the animal, and means for supporting the rear part of the basin from the horse's head.

4. The combination of a reservoir having a bifurcated lower portion forming divergent tubes which latter have widened lower ends, a feed basin having an annular cover through which the tubes extend and to which they are secured, and means for suspending the reservoir and basin.

5. The combination of a reservoir having a bifurcated lower portion forming divergent tubes, a basin to which the lower ends of the tubes are attached, an annular cover for the basin, and a shield at the rear of the basin extending upwardly from the rim thereof.

6. The combination of a reservoir having a bifurcated lower end forming downwardly projecting rearwardly extending tubes, a basin attached to and supported by said tubes, means for suspending the reservoir from the top of the head of the animal, means for holding the lower portion of the reservoir in place on the animal's head, and means for supporting the rear portion of the basin.

7. The combination of a reservoir having a bifurcated lower portion forming downwardly projecting rearwardly extending tubes, a feed basin connected with the reservoir, an annular cover for the top of the reservoir, and fastening devices connected to the rear portion of the basin and to the upper rear portion of the reservoir whereby the basin and reservoir may be connected when they are folded.

In testimony whereof, I have hereunto subscribed my name.

EDWARD M. RAND.

Witnesses:
STEPHEN BROPHY,
HAZEL LINDSEY.